June 9, 1942.  W. LEATHERS  2,285,819

AUTOMATIC METER-READING APPARATUS

Filed Oct. 18, 1940

INVENTOR.
W. Leathers

Patented June 9, 1942

2,285,819

UNITED STATES PATENT OFFICE 2,285,819

AUTOMATIC METER-READING APPARATUS

Ward Leathers, Brooklyn, N. Y., assignor, by mesne assignments, to International Business Machines Corporation Application October 18, 1940, Serial No. 361,801

6 Claims. (Cl. 177—351)

In its broadest aspect, the object of this invention is to actuate a plurality of widely separated stations selectively where the stations are joined together and thence to a central station by a circuit consisting of two wires, or one wire and ground, such selective actuation being for the purpose of connecting in the circuit for reading purposes a respective variable resistance the value of which corresponds to the position of a movable member, as for example the indication of a meter dial or pointer.

A more specific object of this invention is to join to a central reading station a large number of meters by the simplest possible wired system which will permit the accurate selection of the individual meters one at a time for reading purposes. In order to obtain this highly simplified wire system leading to such a multiplicity of transmitters, I have found it desirable to use primary and secondary selectors. A primary selector located at any desirable distance from the central reading station is joined to the central station by a single conductor or wire. To the primary selector is joined each by a single conductor or wire as many secondary selectors as is found desirable, such as one hundred scattered in different directions and at varying intervals of distances from the primary selector. These secondary or local selectors are again joined to any desired number of meters or transmitters, such as one hundred, each by a single conductor or wire.

The obtaining of such a simplified system and the reliable operation of the same for the reading of all these widely scattered meters is the primary object of this invention, but it is equally an object that the primary selector and the secondary selector may be actuated over the single conductor from the central station without interfering with each other or with such mechanism as is required within the meter.

The other objects and advantages of the invention will become apparent as the nature of the invention is better understood.

In the accompanying sheet of drawings forming a part of this specification:

Figure 1:
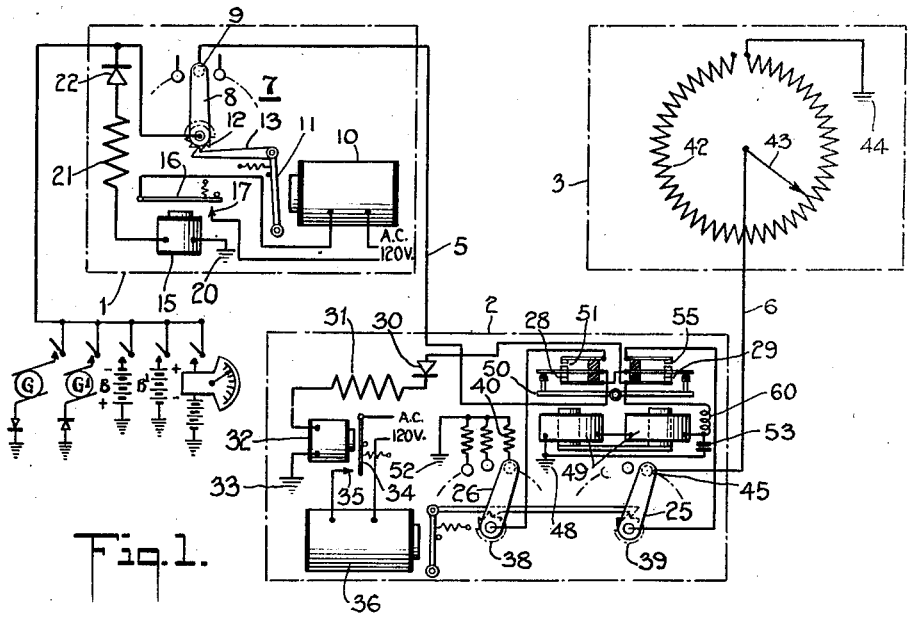
Figure 1 is an electric diagram of meter-reading system showing primary selector, secondary selector and meter, the latter being read from a single variable resistor.

A central meter-reading station, not shown in the diagram, is joined to a primary selector 1 by means of a single wire 4 and ground. Each primary selector is joined to a plurality of secondary selectors (one of which is represented at 2) by means of a single wire 5 and ground. Each secondary selector is wired to each of a plurality of meters (one of which is represented at 3) by means of a single wire 6 and ground. A remotely controlled distributor type switch 7 in the primary selector 1 selects one of the plurality of secondary selectors by means of an arm 8 and a contact 9. The arm 8 is advanced to the next contact by an electro-magnet 10, which attracts an armature 11, advancing a ratchet 12 one position by means of a pawl 13, thus rotating the arm 8. To energize the electro-magnet 10, a coil 15 must first be energized, which by means of an armature 16 closes a contact 17 which closes a circuit through coil 10. The power used for energizing coil 10 may be obtained from a local source, preferably a lighting line. The coil 15 is energized by rectified alternating current, preferably 60 cycle, supplied by a generator G from the central reading station over the line 4. The negative half cycles are used. When negative half cycles are applied to the line 4, the line becomes negative and the ground positive with respect thereto. Therefore, current will flow from a ground 20, through coil 15, a resistor 21 and a copper oxide rectifier 22. The copper oxide rectifier 22 passes current only in one direction, therefore, if positive half cycles are applied to line 4 the rectifier 22 blocks current flowing through the resistor 21 and the coil 15 to ground 20. Thus when negative half cycles of alternating current are applied to line 4, the coil 15 will actuate thus energizing coil 10 which advances arm 8 one position. Line 4 is electrically joined to line 5 by means of an arm 8 and contact 9. By applying positive half cycles of current to lines 4—5 from a generator G¹, an arm 25 and an arm 26 may be advanced one position at a time. The current now flows from line 4, to arm 8, contact 9, line 5, a contact 28, a contact 29, a copper oxide rectifier 30, a resistor 31 and electric relay 32 to a ground 33. This current energizes the relay 32 which attracts its armature 34 making a contact 35, completing a local circuit containing an electromagnet 36. When 36 the electro-magnet becomes energized it advances the arms 25 and 26 by means of ratchets 38 and 39. Negative half-cycles if applied to line 4 will, as already explained, cause the primary selector 1 to advance. These half-cycles will not affect the secondary selector 2 because of the blocking action of rectifier 30 to all negative current flow. Positive half-cycles when applied to line 4 will not affect the primary selector 1 because of the blocking action of rectifier 22. These half-cycles will advance the secondary selector 2 as previously explained.

The arm 26 contacts one of a plurality of resistors 40. The arm 25 selects one of a plurality of meters 3. The meter 3, consists essentially of a resistor 42, an arm 43, and a measuring device which rotates arm 43 through a corresponding arc for every unit of commodity metered. One end of the resistor 42 is grounded at 44. The line 6 is electrically joined to arm 43. Therefore, between line 6 and ground there is the part of the resistor 42 that is tapped by arm 43. The amount of this resistance is proportional to the meter indication. Line 6 is wired to a terminal 45 which is contacted by arm 25. By measuring the resistance between line 6 and ground, the meter indication may be computed. In order to make remote meter-reading practical, the meter must be identified as well as read. Therefore, one of the plurality of resistors 40 is read before a meter is read. There is one resistor or resistance for each meter (such as meter 3 joined to the selector by the wire 6) and each resistance has a progressive value different from all the others. When the meter is selected the corresponding resistance 40 is read first, then the meter is read. The reading obtained from resistance 40 is an identification number corresponding to that particular meter of all those joined to selector 2. In no way can a meter being read be incorrectly identified. Since the arms 25 and 26 are absolutely synchronized the resistor 40 will positively identify the meter 3 even though the identifying resistor in the local selector and the meter are widely separated.

To read the identifying resistor, a pulsation of low voltage direct-current is applied to line 4 from a battery B or the like at the central station so that it makes the line 4 negative with respect to ground and battery B. A current will immediately flow from a ground 48 through a polarized relay 49, coil 60, contact 29, contact 28, line 5, contact 9, arm 8, to line 4. This will cause an armature 50 of the polarized relay 49 to rotate clockwise. Contact 28 will be opened and contact 51 closed. From line 5 there is a circuit through contact 51, arm 26, identifying resistor 40 to a ground 52. The armature 50 is held in this position even though line 5 has been disconnected from the relay 49 because the relay is receiving energy that was stored up in a condenser 53 shunted across it. Coil 32 has also been disconnected from the circuit by the opening of contact 28. The circuit from the reading station now comprises only the resistor 40 and the relay 15 in the primary selector 1, in parallel to ground. If the resistor 40 is measured with a current that makes the line 4 positive, the rectifier 22 will block the current from passing through the primary selector. Therefore, the resistor 40 is the only effective thing in the circuit and a reading thereof may be obtained at the central station by means of a meter M.

To read the meter 3, a pulsation of low voltage direct-current is applied to line 4 at the central station from a battery B' so that it makes the line positive with respect to ground. Assuming that the armature 50 has returned to its normal position a current will immediately flow from the battery B' through line 4, arm 8, contact 9, line 5, contact 28, contact 29, coil 10, relay 49 to ground 48. This will cause the armature 50 to rotate counter-clockwise thereby breaking the contact 29 and closing a contact at 55. The circuit from line 5 now goes through contact 28, contact 55, arm 25, terminal 45, line 6, arm 43, part or all of the resistor 42 to ground 44. Again the armature 50 is held in position by condenser 53 even though the relay 49 has been cut out of the circuit by the opening of contact 29. The resistance is measured in exactly the same way as before by means of the meter M. The resistors 21 and 31 are used to prevent the low voltage direct current from energizing coils 15 and 32. The coil 60 blocks alternating current and prevents it from affecting the direct current polarized relay 49. Constants for typical operation of this system may, if so desired, be 49 volts for alternating current, 6 volts for direct current, and any voltage under 49 volts for reading purposes.

Figure 2:
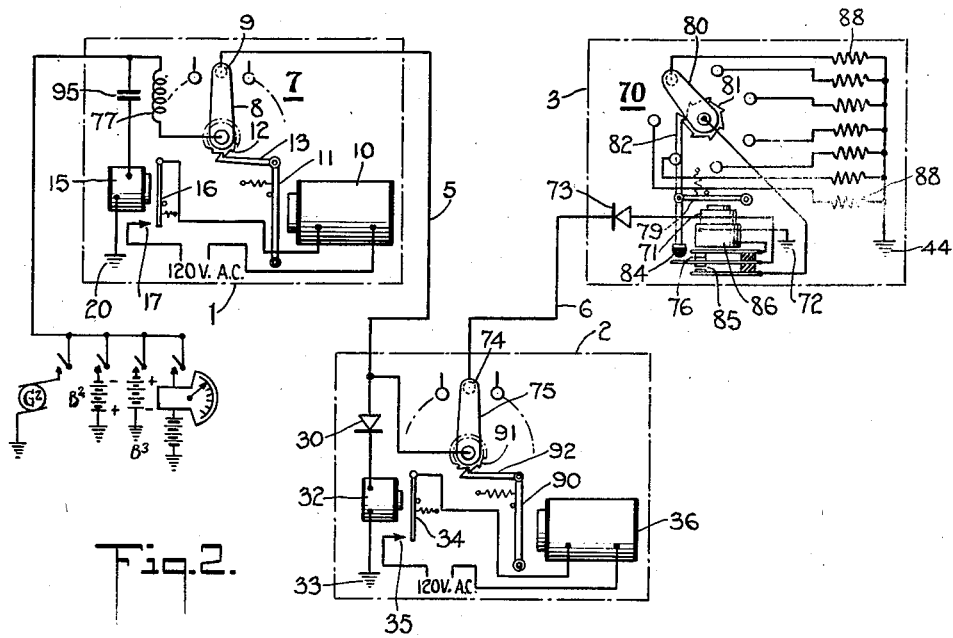
Figure 2 is the same, excepting that the meter is read from a series of fixed resistances.

A modification of the one wire meter-reading system shown in Figure 1 consists of putting a cyclometer in the meter to be read and putting the identifying resistors in the meter as shown in Figure 2. In the meter 3, a phaser or remotely controlled switch 70 advanced by an electro-magnet 71, puts a multiplicity of resistances or resistors, preferably seven in number, into the circuit one at a time. The first three resistances are fixed in value and used to identify the individual meter. The other four resistances represent the meter register reading. Each of these four resistances has a value determined by the numeral from 0 to 9 to which it corresponds. To read and identify such a meter seven separate readings must be obtained. To take a reading, a direct current voltage from a battery $B^2$ or the like is applied between the line 4 and ground at the central reading station which makes the line negative with respect to ground. Current will then flow from a ground 72, through the coil 71, a contact 76, a copper oxide rectifier 73, the line 6, a contact 74, a distributor arm 75, the line 5, contact 9, arm 8, a choke 77, to the line 4. This current energizes the magnet 71. If the voltage were of the opposite polarity, current would not flow through the magnet 71 because of the blocking action of copper oxide rectifier 73. As soon as the magnet 71 is energized it attracts an armature 79 which advances an arm 80 in the phase-switch 70 one position, by means of a ratchet 81 and a pawl 82. A plunger 84 opens contact 76 and closes a contact 85. When contact 76 opened it broke the circuit of magnet 71, which is not deenergized immediately, however, because of the action of a copper jacket 86. While the meter apparatus is in this position the value of the first resistance may be measured by means of a meter M'. The measuring current will flow from the ground 44 through a resistance 88, arm 80, contact 85, rectifier 73, line 6, contact 74, arm 75, line 5, contact 9, arm 8, choke 77 to line 4 through the meter M'. The next resistance is measured in the same manner as soon as the magnet 71 is deenergized. The secondary selector 2 is advanced to the next meter line by applying a direct current voltage from a battery $B^3$ or the like across line 4 and ground so that line 4 is made positive. A current then flows from line 4, through choke 77, arm 8, contact 9, line 5, copper oxide rectifier 30, the relays 32 to ground 33. This current energizes relay 32 and attracts armature 34 to contact 35, closing the circuit of magnet 36. Magnet 36 is then energized, attracting an armature 90, and advancing the arm 75 one position by means of ratchet 91 and pawl 92. As explained, current that flows through the secondary selector 2 will not affect the meter 3 because of the blocking effect of rectifier 73 to current of this polarity. Current that flows through the meter must be of opposite polarity and will not affect the secondary selector because of the blocking action of rectifier 39. The primary selector 1 is advanced by applying alternating current voltage from a generator $G^2$ between line 4 and ground. Current then flows from the line 4, through a condenser 95, the relay 15 to ground 20. This current will energize relay 15 and attract armature 16 to contact 17 thus closing the circuit of magnet 10 which when energized will attract armature 11 and advance arm 8 one position by means of ratchet 12 and pawl 13. The condenser 95 blocks all direct current from relay 15 and prevents the secondary selector and meter pulses from affecting it. However, the condenser 95 allows alternating current to flow. Thus the primary selector cannot be advanced except by alternating current. The choke 77 blocks alternating current from the secondary selector and the meter. However, it allows direct-current to flow. Thus the secondary selector and meter are unaffected by the alternating current needed to pulse the primary selector.

The invention is not to be limited to the exact arrangement of parts shown in the accompanying drawing as various changes are contemplated within the spirit of the accompanying claims.

What is claimed is:

1. In an apparatus for selectively and electrically connecting a plurality of widely distributed meters to a central station and for reading the same, a source of ground, a primary selector, a plurality of secondary selectors, a single reading wire leading from the central station to the primary selector, a single wire leading from the primary selector to each of the secondary selectors, a single wire leading from each of the secondary selectors to a plurality of meters whereby the latter are arranged in groups, a step-by-step selector switch at the primary selector for sequentially connecting the reading wire to said second-mentioned wires, a stepping magnet for actuating the switch, a source of energizing current for the magnet independent of the reading wire, a relay for applying impulses of said energizing current to the stepping magnet, said relay being responsive to individual pulsating current of one polarity, a unidirectional device connected to the reading wire and in series with the relay, a selector switch at each secondary selector for separately and selectively connecting the wire leading thereto from the primary selector to said wires leading to the group of meters with which the particular secondary selector is associated, a stepping magnet for the latter selector switch, a source of energizing current for the latter magnet independent of the reading wire, a relay for applying impulses of energizing current to the latter magnet, said latter relay being responsive to unidirectional current of opposite polarity from that employed to operate the other relay, and a unidirectional device connected to the wire leading from primary selector and in series with said latter relay.

2. In a telemetric system, a central station, a plurality of meters each having a reading resistance element associated therewith, a selecting mechanism, a main telemetric and operating channel leading to the selecting mechanism from the central station, branch telemetric channels leading from the selecting mechanism to each meter, means controlled by the volume consumption of the metered product for cumulatively connecting increments of the reading resistance element of each meter into its respective branch channel, said selecting mechanism including a plurality of identifying resistances, a step-by-step mechanism for separately and successively connecting each identifying resistance in the main channel, a step-by-step mechanism for separately and successively connecting each branch channel in the main channel, a stepping magnet common to the step-by-step mechanisms for actuating the same in unison, a relay responsive to unidirectional pulsating current for actuating the magnet, means connecting the relay in the main channel including a unidirectional device for blocking current of opposite polarity, an alternatively operable two-way switch in series with each step-by-step mechanism for completing the connections betwen the branch channels and the main channel and between the identifying resistances and the main channel respectively, for reading purposes, a polarized relay responsive to low voltage current of one polarity for operating the switch in one manner and responsive to low voltage current of the opposite polarity for operating the switch in the other manner, a holding device for the polarized relay manner, means for selectively applying current of low voltage and opposite polarity to said main channel for switch-operating and reading purposes and for applying pulsating unidirectional current to the main channel for actuating the stepping magnet relay.

3. In a telemetric system, a central station, a primary location, a plurality of secondary locations and a plurality of meters adapted to be read at a central station, a plurality of resistances for each meter adapted to be read at the central station, a plurality of resistances for each meter of different impedance values each representing a different indication of the meter, a combined impedance reading and actuating circuit connecting the meters to the central station through the secondary and primary locations, a selector switch at the meter for separately and successively connecting said resistances in the circuit, a selector switch at the secondary location for selecting the meters, a selector switch at the primary location for selecting the secondary locations, means responsive only to the application of current impulses of a selected character for actuating the resistance-selecting switch, means responsive only to the application of current impulses of a different selected character for actuating the selector switch at the secondary location, means responsive only to current impulses of a selected character different from the other selected current for actuating the switch at the primary location, means for selectively applying current impulses of the various selected character to the circuit.

4. In a telemetric system, a central station, a primary location, a plurality of secondary locations and a plurality of meters adapted to be read at a central station, a plurality of meter resistances for each meter, an additional meter-identifying resistance for each meter, a combined impedance reading and actuating circuit connecting the meters to the central station through the secondary and primary locations, a selector switch at each meter for sequentially connecting said meter resistances in the circuit, a direct current indicator in the circuit, a pair of selector switches at each secondary location for selecting the meters and meter identifying resistances respectively, a selector switch at the primary location for selecting the secondary locations, means responsive only to the application of pulsating current of one polarity for actuating the pairs of switches at the secondary selectors simultaneously, means responsive only to the application of pulsating current of the opposite polarity for actuating the selector switch at the primary location, means at the secondary locations responsive only to direct current impulses of one polarity for connecting the selected meter-identifying resistances in the circuit and responsive only to direct current impulses of the opposite polarity for connecting the selected meter resistances in the circuit, and means for selectively applying pulsating and direct current impulses of opposite polarity to the circuit.

5. In a telemetric system, a main reading circuit 5, a plurality of branch meter reading circuits 6, a variable resistance in each branch meter reading circuit, a plurality of fixed meter-identifying resistances 40, a selector switch 25 for sequentially connecting the branch circuits to the main reading circuit, a second selector switch 26 for sequentially connecting the fixed resistances in the main reading circuit, means 36, 32 for actuating the selector switches in unison, a switch having a pair of contacts 51 for disconnecting the selected fixed resistors from the main reading circuit and a pair of contacts 55 for disconnecting the selected branch circuits from the main reading circuit, said switch having a movable armature operable in one position to open one of said pair of contacts and close the other pair of contacts and operable in another position to reverse the opening and closing of said pairs of contacts, a solenoid having a winding responsive to unidirectional current of one polarity to move the armature to one of its positions and responsive to unidirectional current of the opposite polarity to move the armature to its other position, said winding being connected in the main reading circuit in series with said contacts, and means for selectively applying unidirectional current of opposite polarity to the main reading circuit.

6. In a telemetric system, a main reading circuit 5, a plurality of branch meter reading circuits 6, a variable resistance in each branch meter reading circuit, a plurality of fixed meter-identifying resistances 40, a selector switch 25 for sequentially connecting the branch circuits to the main reading circuit, a second selector switch 26 for sequentially connecting the fixed resistances in the main reading circuit, means 36, 32 for actuating the selector switches in unison, a switch having a pair of contacts 51 for disconnecting the selected fixed resistors from the main reading circuit and a pair of contacts 55 for disconnecting the selected branch circuits from the main reading circuit, said switch having a movable armature operable in one position to open one of said pair of contacts and close the other pair of contacts and operable in another position to reverse the opening and closing of said pairs of contacts, a solenoid having a winding responsive to unidirectional current of one polarity to move the armature to one of its positions and responsive to unidirectional current of the opposite polarity to move the armature to its other position, said winding being connected in the main reading circuit in series with said contacts, means for selectively applying unidirectional current of opposite polarity to the main reading circuit, and an energy storing device connected across the terminals of said winding to provide a delayed holding action on the solenoid.

WARD LEATHERS.

CERTIFICATE OF CORRECTION.

Patent No. 2,285,819.　　　　　　　　　　　　　　　June 9, 1942.

WARD LEATHERS.

It is hereby certified that error appears in the printed specification of the above numbered patent requiring correction as follows: Page 2, first column, line 43, strike out the words "and battery B" and insert the same after "4" and before the period in line 46; page 3, second column, line 29 claim 2, after "relay" insert a comma; and that the said Letters Patent should be read with this correction therein that the same may conform to the record of the case in the Patent Office.

Signed and sealed this 4th day of August, A. D. 1942.

Henry Van Arsdale,
(Seal)　　　　　　　　　　　　　　　　Acting Commissioner of Patents.